(12) United States Patent
Dierks (10) Patent No.: US 6,948,061 B1
(45) Date of Patent: Sep. 20, 2005

(54) METHOD AND DEVICE FOR PERFORMING SECURE TRANSACTIONS

(75) Inventor: Timothy Dierks, San Francisco, CA (US)

(73) Assignee: Certicom Corp., Mississauga (CA)

( * ) Notice: Subject to any disclaimer, the term of this patent is extended or adjusted under 35 U.S.C. 154(b) by 684 days.

(21) Appl. No.: 09/665,763

(22) Filed: Sep. 20, 2000

(51) Int. Cl.[7] ................................................. H04L 9/00

(52) U.S. Cl. ...................... 713/159; 713/156; 713/169; 713/170

(58) Field of Search ............................... 713/159, 156, 713/168, 169, 170

(56) References Cited

U.S. PATENT DOCUMENTS

| | | | |
|---|---|---|---|
| 5,535,276 A | * | 7/1996 | Ganesan ...................... 713/155 |
| 5,546,463 A | * | 8/1996 | Caputo et al. .............. 713/159 |
| 5,781,723 A | * | 7/1998 | Yee et al. .................... 713/200 |
| 5,903,878 A | * | 5/1999 | Talati et al. .................. 705/26 |
| 5,982,898 A | | 11/1999 | Hsu et al. |
| 6,035,402 A | | 3/2000 | Vaeth et al. |
| 6,092,202 A | * | 7/2000 | Veil et al. .................... 713/201 |
| 6,233,577 B1 | * | 5/2001 | Ramasubramani et al. .... 707/9 |

FOREIGN PATENT DOCUMENTS

WO    WO 98/52163 A    11/1998

OTHER PUBLICATIONS

Rivest, Ronald L., Can We Eliminate Certificate Revocation Lists?, Financial Cryptography, Feb. 23-25, 1998, 178-183.
Lopez, et al., "Providing secure mobile access to information servers with temporary certificates." Computer Networks, Nov. 10, 1999, , Pp. 2287-2292, vol. 31, No.21, Elsevier Science Publishers, B.V., Amsterdam, NL.

* cited by examiner

Primary Examiner—Norman M. Wright
(74) Attorney, Agent, or Firm—Ralph A. Dowell; Dowell & Dowell P.C.

(57) ABSTRACT

A certificate validity verification engine is integrated into the logic of a secure token, in turn, making the use of a private key conditional upon the determination that the certificate for the corresponding public key is valid at that particular instant in time. In this manner, the existence of a digital signature that is verified with a certificate implies that the certificate was valid at the time the signature was created. The verification of the certificate's validity by the relying party is unnecessary, as the signature could not have been created had the certificate been invalid. The validity of a certificate is communicated at the time the signature was created, rather than at the time the signature was verified.

9 Claims, 4 Drawing Sheets

METHOD AND DEVICE FOR PERFORMING SECURE TRANSACTIONS

BACKGROUND OF THE INVENTION

1. Field of the Invention

The invention relates to certificates issued for the purpose of identification, and more specifically to the determination of a certificate's validity.

2. Description of the Prior Art

Traditionally, secure tokens are physically-secured, tamper-resistant devices intended to create digital signatures, perform decryption, or otherwise perform operations using a private key or secret symmetric key. Tokens may be incorporated in hardware on a computer or may be integrated with mobile devices such as "smart cards" and wireless devices. The cryptographic implementation and the key material is enclosed in a secure shroud such that the correct operation and usage of the key can be assured. Typically, that the key will only be used upon presentation of an appropriate PIN or passphrase. The key is generally used only for approved secure operations, and the construction of the token is such that this key will not be disclosed outside of the secure shroud, and thus it cannot be copied. Often a secure token includes a signing engine and a private key, $\alpha$, for which the public key is A. The public key has been certified by a Certificate Authority (CA), which has issued the certificate $C_A$. The token is in communication with an application that makes use of the token for the creation of digital signatures, decrypting data, and the like. The application communicates a request to the cryptographic engine in the token, along with a PIN or passphrase, and the cryptographic engine executes the request using the private key. The request may be to sign a message, to decrypt an encrypted message, or some other request which would require the use of the private key. For each request posed by an application, a CA must assess the validity of that request, and therefore thr validity has to be assessed at the originating and receiving ends.

The public key infrastructure (PKI) has proven to be a secure mechanism for distributing keys and binding attributes to those keys in a trusted manner. It is intended to bind an identity to a public key such that the holder of the corresponding private key is known to be of a particular identity. In order to accomplish this task, certificates are issued which is a document that binds an identity to a public key. This binding is enforced, generally by a digital signature of a Certificate Authority. A CA is a trusted entity, trusted to provide certificates that bear signatures to individuals and entities that are able to verify their identity. A group of members that place trust in a common CA forms a public key infrastructure. When a pair of members in a PKI wish to communicate, they must verify the authenticity of each other's certificates. The difficulty however, is introduced when trying to determine if a certificate is valid on an ongoing basis and, in turn, when to reject a revoked certificate. Proposed methods to overcome this difficulty fall into several categories; namely short-lived certificates, on-line status, and revocation lists.

Short-lived certificates issued are valid for only a short period of time e.g./24 hours. These certificates are reissued regularly such that there is always a current and valid certificate. Relying parties do not need to verify the certificate's ongoing validity. If the security of a private key is compromised and reported to the certifying authority, the window of vulnerability ends when the current certificate expires and the certificate is not reissued. However, short-lived certificates require the certifying authority to reissue all of the outstanding certificates on a regular basis. This process can be computationally expensive and requires automated, online access to the certificate-signing key. This, in turn, makes the process more vulnerable to attack than a CA which can keep its key off-line and/or less automated. Further, short-lived certificates have an inherent window of vulnerability from the time the private key is compromised until the time the certificate expires. In addition, regularly reissuing and distributing the certificates is expensive, difficult to scale to larger systems, and has a single point of failure for the entire PKI.

Another method to assure certificate validity is to assess the on-line status of a certificate each time that certificate is presented. On presentation of a certificate, the relying party requests the current validity of the certificate from the certifying authority. For efficiency, an implementation may include some caching such that the status of a certificate is only retrieved from the certifying authority if the last request for its status happened long enough ago to be considered "stale." Checking the status of a certificate online requires each relying party to contact the CA or its designated representative each time a transaction is processed. Even with the availability of at least some caching of certificate validity, the number of queries is approximately one per transaction per relying party. Further, few systems involve repeated transactions with the same party. More often it is the case that each transaction is the first time a relying party has interacted with the certified party for a period of time, even in the case where either party is involved in transactions on an ongoing basis. Furthermore, the online status requires that all relying parties have the ability to contact the CA whenever they wish to validate a certificate.

A third method to ensure the validity of certificates is through the review of a revocation list. A revocation list details certificates that have been rendered invalid, e.g./they have been revoked, and is kept by the certifying authority. The list is provided to relying parties and is updated on a regular basis and/or when new certificates are revoked. A relying party reviews the revocation list to ensure that a certificate does not appear on the list before accepting a certificate as valid. The list may take the form of a simple list of certificates or may be some other method of communicating the set of revoked certificates. Revocation lists, in some situations, may become sizable where there are many revoked certificates. Further, the lists must be reissued on a regular basis and distributed to the relying parties. In addition, revocation lists only describe the validity of a certificate at the time they are issued. When a certificate is revoked, the revocation information will not be available to the relying party until the regularly scheduled update of the CRL. If the CRL is updated before its regularly scheduled time, the relying party must contact the CA for confirmation that its local CRL is up to date. This devolves into having the same performance characteristics as checking the certificate's status online.

Most certificate validity assertions from certificate authorities, such as online certificate status messages or certificate revocation lists, bear signatures from the CA or some entity authorized by the CA to issue certificate status. This signature is necessary to indicate the accuracy of the information. Even a statement such as "The current CRL has not changed; there is no subsequent update" must be signed. Furthermore, to prevent replay attacks, most status messages must be signed for by each requestor. Protocols are designed such that the requestor is certain that the message was signed specifically for them, and is not a stale message being replayed by an attacker. This can create a very high computational and communication burden on the CA and its authorized representatives. The result is a system that is not particularly scalable.

With existing methods, as described above, the validity of a certificate is determined by the relying party at the time of reliance on a certificate and is thus subject to any error windows resulting from a delay in updating validity information. This can lead to both positive and negative errors. In the case where a relying party is sending a message, the relying party determines that a certificate is valid, encrypts the message, and sends it. At some later point, the private key of the recipient is compromised and the recipient's certificate revoked. However, all existing encrypted messages may still be decrypted, even though the certificate is no longer valid. Further, in the case where a user generates a valid signature using their private key, if that private key is later compromised and the certificate is revoked, the signature can no longer be validated, even though it was generated correctly and securely. The problem resides in the fact that the validity of a certificate controls the use of the public key since it is consulted by relying parties who are about to use a certificate. However, the validity of a certificate also communicates the security of the private key in that a certificate is revoked when the holder of the private key can no longer be associated with the identity or privileges communicated in the certificate.

It is an object of the present invention to obviate and mitigate at least some of the aforementioned disadvantages of the prior art.

SUMMARY OF THE INVENTION

It is accordingly a principal objective of the present invention to establish a system for the validation of a certificate's authenticity at the time of private key usage.

In general terms, this invention provides a system for facilitating the validation of an issued certificate, and further, enables the relying party to process a certificate, knowing the certificate to be valid without independently scrutinising its validity. The system comprises a cryptographic engine, a validation engine, at least one interface to a certificate authority, and an independent application. The application communicates a request to the cryptographic engine within a secure token along with a personal identifier. The secure token further includes a signing engine and private key "α" for a known public key "A". The cryptographic engine executes the request using the private key. On each request from the application to utilize the private key "α" (for creating a signature, decrypting a message, or any other allowed purpose) the validation engine is invoked. The validation engine has the ability to allow or disallow the completion of the requested private key operation. On each such request the validation engine determines whether a certificate is treated as valid at that moment or instant in time and operates accordingly.

A request, such as a signature, is only generated (or a message is decrypted) only if the certificate continues to be valid. Thus a relying party utilizing the private key of certificate CA does not need to make an independent determination of the certificate's validity. In the case of a signature, the existence of a signed message implies that the certificate was valid at the time the signature was created and thus, that such a signature is treated as acceptable. This determination does not require that the relying party contact the certification authority, as the validation engine associated with the private key has performed that task. Similarly, when the relying party generates an encrypted message intended for the holder of certificate CA, they are secure in the knowledge that the message may only be decrypted if the certificate is valid at the time of decryption.

By operating in this manner there is the additional advantage of determining validity of a certificate at the time of private key usage, as opposed to the time of certificate reliance. Using a token incorporating a validity engine, the validity of a certificate controls the use of the private key, and as such, binds the meaning of certificate revocation to the effect of the revocation and, in turn, prevents further use of a certified private key.

In order to securely communicate to the relying party that there is no need for the recipient to verify the validity of the certificate a certificate extension signed by the CA is added when the CA issues a certificate. Thus, when a relying party processes a certificate with this extension, they are aware that it is not necessary to independently check the validity of the certificate. If a certificate does not have such an extension, the validity of a certificate cannot be assumed without independently verifying its validity.

The validation engine may further determine if the utilization of private key "α" is consistent with a particular policy associated with the use of that private key. The policy is customizable by the end user. If the certificate is valid and the key usage is appropriate, the private key operation is allowed to complete; if not, the private key operation is terminated. The validation engine operates in such a fashion that its determination as to the validity of a certificate is secure against tampering and interference by any party controlling the token or the token's communications channels with the outside world. This is especially true of communication channels with parties who may assist the validation engine in its determination as to the certificate's validity.

BRIEF DESCRIPTION OF THE DRAWINGS

These and other features of the preferred embodiments of the invention will become more apparent in the following detailed description in which reference is made to the appended drawings wherein.

DESCRIPTION OF THE PREFERRED EMBODIMENTS

A system for establishing the validity of a certificate's authenticity is illustrated in FIGS. 1–5 and is generally designated by reference numeral 10.

Figure 1:
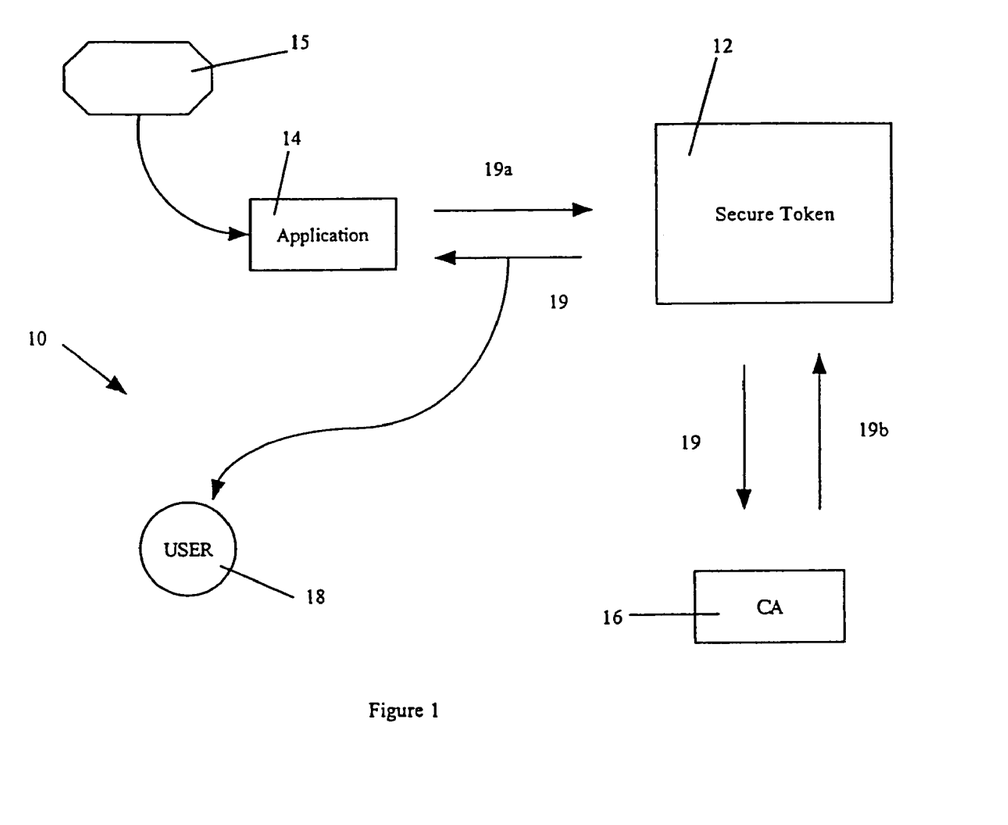
FIG. 1 is a is a schematic diagram of an overview of a computer system.

As shown in FIG. 1, the system comprises an application 14 controlled by an originating correspondent 15, a recipient correspondent 18, and a certificate authority (CA) 16, interconnected by communication links 19 to a secure token 12. The secure token 12, as shown in FIG. 2, further includes a validation engine 20, a certificate 22, a cryptographic engine 26, and a private key 24 all stored within a secure boundary 25.

The system 10 enables an application 14 (commanded by third party user) to communicate a request to the secure token 12 by a link 19a. The request maybe to sign a message, decrypt an encrypted message, or any other action that would require the use of a private key. On receipt of a request from the application 14, the secure token 12 communicates with the certificate authority (CA) 16 over link 19b in order to assess the validity of the request. The certificate authority 16 returns a message to the secure token 12 indicating the status of the certificate 22, and if the request is valid enables the token 12 to sign the message and append a certificate 22. The signed message and certificate 22 is sent either to the application 14 or forwarded directly to the end user 18. Once the user 18 receives the certificate 22, the user 18 may be assured that the certificate authority 16 has validated the certificate 22 at the time of issue. Thus, there is no need for user 18 to authenticate the validity of the certificate.

Figure 2:
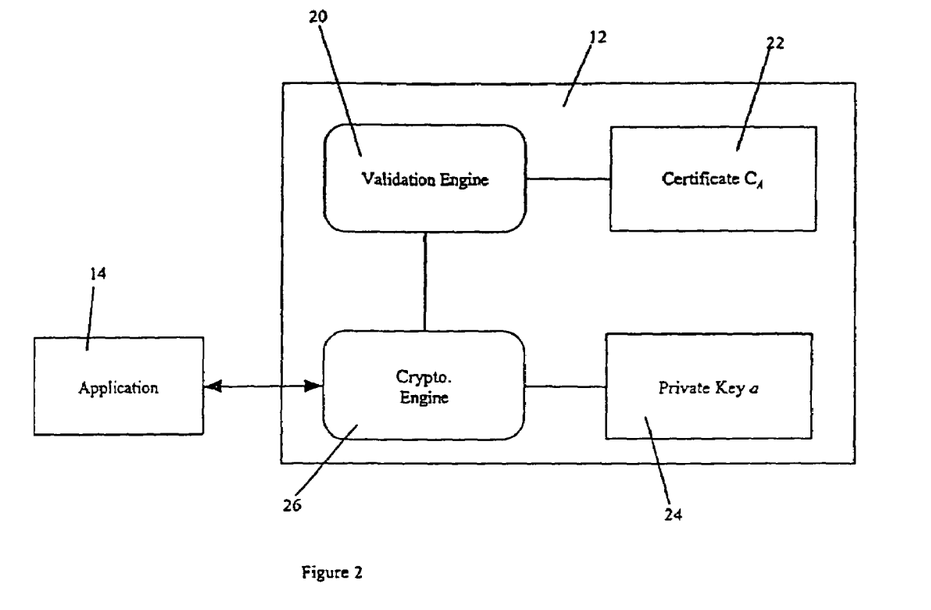
FIG. 2 is an expanded view of the secure token of FIG. 1.
Figure 4:
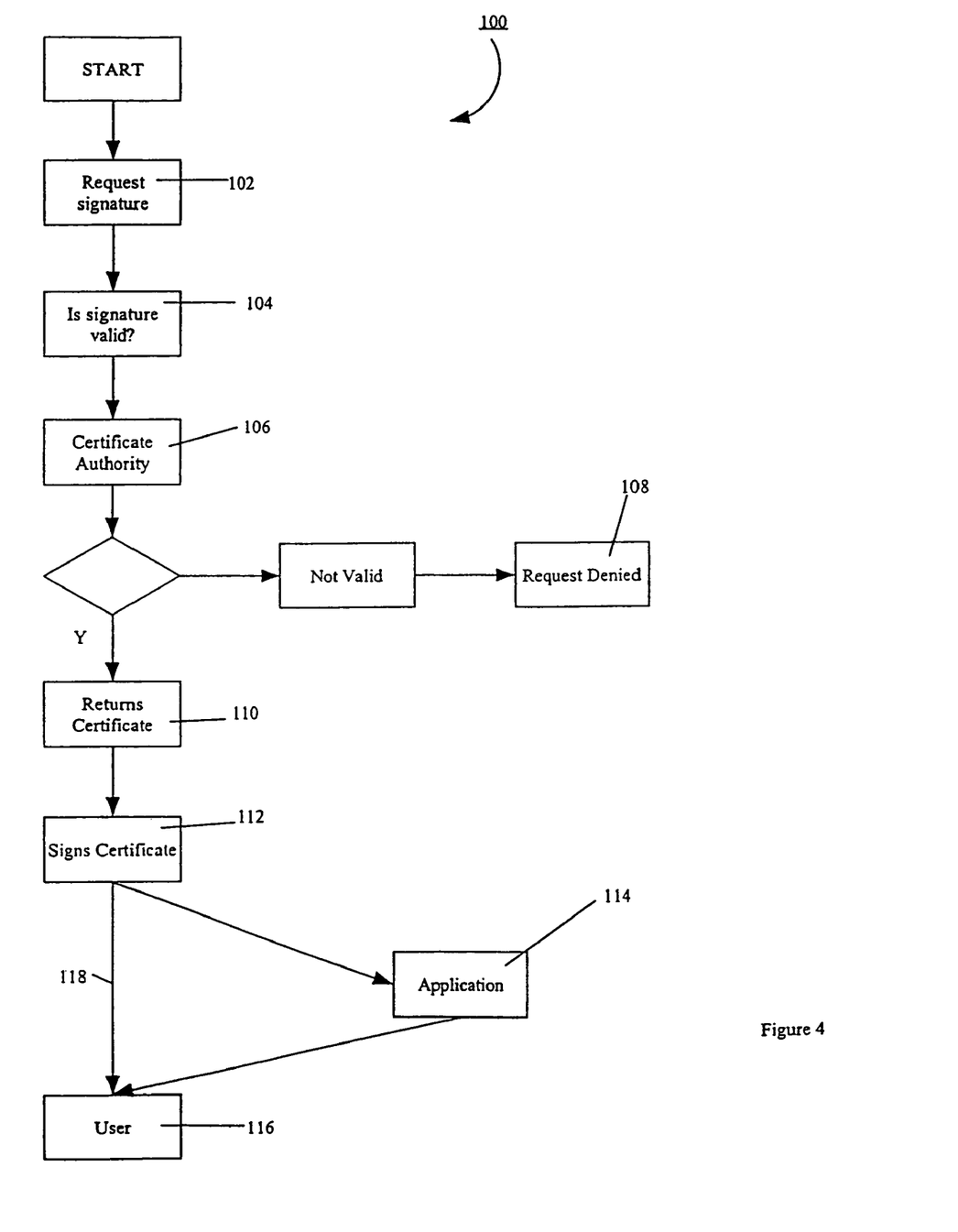
FIG. 4 is a functional block diagram detailing the method for establishing a certificate for use in the validation of a request between a pair of nodes on a public key infrastructure, in the computer system of FIG. 1.

FIG. 4 details the manner in which a signature is validated using the system 10 illustrated in FIGS. 1 and 2. The process begins with an application 14 requesting a signature from the secure token 12 on a message, m. Upon receipt of the request, 102, the validation engine 20 within token 12 sends an inquiry at 106 to certificate authority 16 to determine if the certificate 22 is valid and may be appended. If the certificate 22 has been revoked, authorization is not issued and the request is denied 108. If the certificate 22 is valid however, the certificate authority 16 returns an authorization to the secure token 12. The validation engine 20 receives the authorization and enables the cryptographic engine 26 within the secure token 12 to execute the original request 112, creating a digital signature utilizing the private key "α". Once the message is signed, the certificate 22 is appended and returned to the application 114. In turn the application 14 sends the certificate 22 onto the user 116. In the alternative, the certificate 22 is sent directly to the user 118. The transmission of the request and return of the authorization will be conducted in a secure manner utilizing public key protocols to ensure the authenticity of the request.

The validation engine 20 within the secure token 12 operates in such a fashion that once it determines the validity of a certificate, the end user 18 is not required to also perform an independent validation. The validity of a certificate controls the use of the private key 24 through the validation engine 20, and as such, binds the meaning of certificate revocation to the effect of that revocation. This prevents further use of a certified private key when a certificate 22 is revoked. In the case of a digital signature as described in FIG. 4, a signed message would remain valid even after a certificate 22 has been revoked, because the signature could not have been generated after the moment of certificate revocation. In the case where a request is to decrypt a message, if the private key 24 is compromised (through theft of the token, etc.,) the certificate 22 is revoked and the secure token 12 would cease to honor requests to decrypt messages, meaning that any existing encrypted messages could no longer be decrypted.

In the preferred embodiment, the ability to enable the system 10 to avoid the user 18 from requiring an independent validity check is incorporated as an attribute of the certificate 16.

Figure 3:
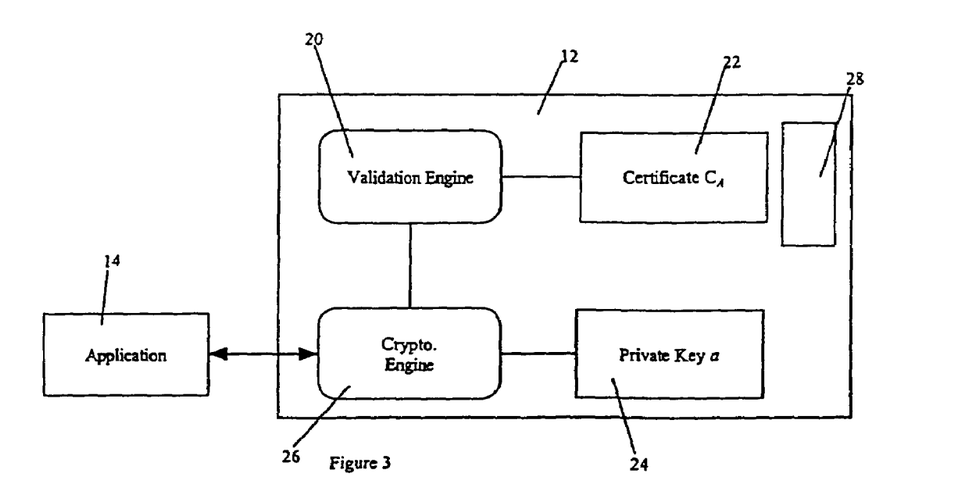
FIG. 3 is a further detailed view of FIG. 2.

In order to ensure that the user 18 is aware that the validity of the certificate need not be checked, an indicator mechanism is required. One way that this is achieved is by specifying a certificate extension 28 as shown in FIG. 3. This certificate extension 28 is signed by the certificate authority 16, shown in FIG. 1, when a certificate 22 is issued and is appended only when authorization is received from the CA 16. Therefore, when user 18 processes a certificate having an extension 28, the user is aware that it need not independently check the validity of that certificate 22. In the case where a certificate 22 does not have such an extension, it can not be assumed valid without independently checking its validity.

However, in an alternate embodiment, this attribute could be implicitly associated with the key pair. An implicit key pair association requires a mechanism or policy to prevent a CA from issuing a certificate to the key pair without that CA having some assurance that the secure token 12 hosting the private key 24 is checking the validity of the certificate issued by the CA on an ongoing basis, thus controlling the use of the private key based on that information.

Prior to a CA 16 issuing a certificate 22 with an extension 28 that indicates that the private key is controlled in manner previously described, the CA must determine that the private key is held by a secure token 12 that will enforce a validity checking policy. However, it is also desirable to allow the token 12 the ability to generate a key pair and have that key pair certified while the token 12 is under the control of the end user. This enables the end user to ensure total control over the use of the private key from the moment of its generation.

Figure 5:
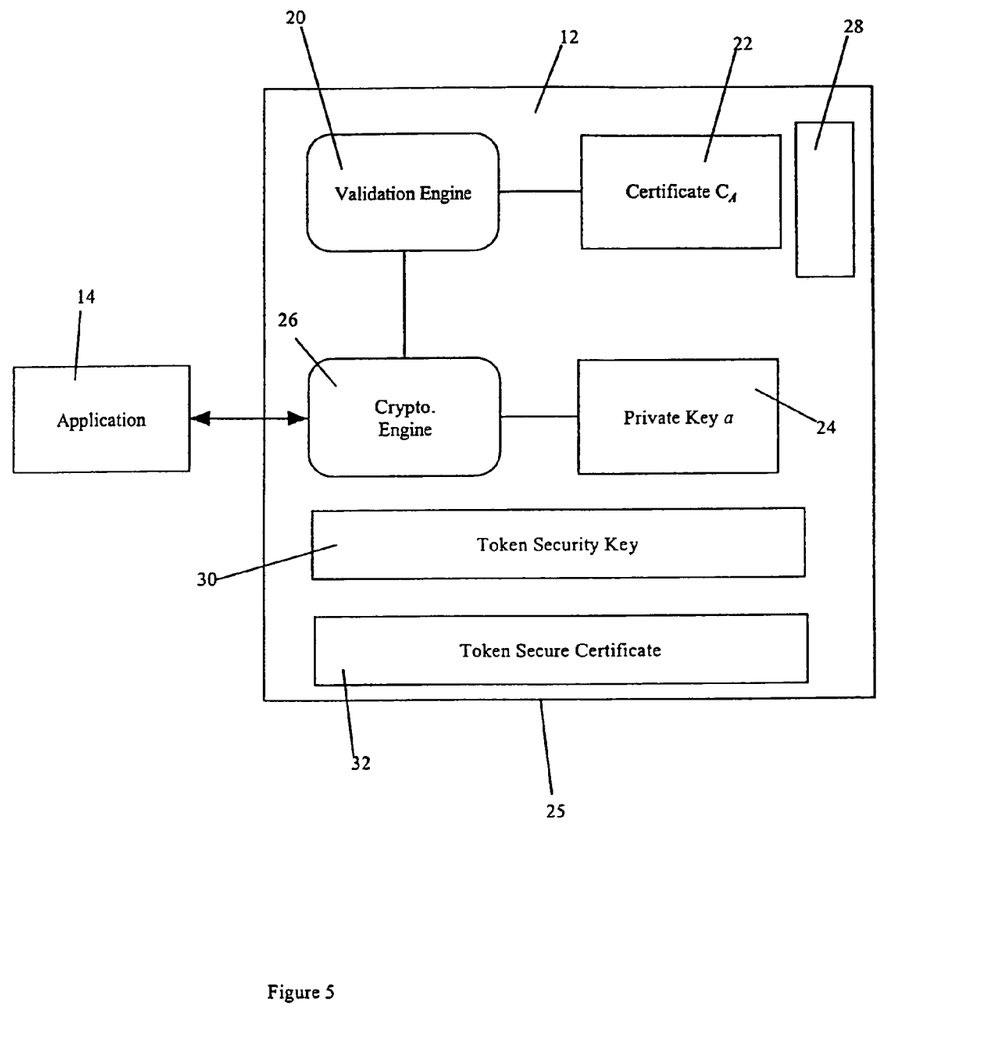
FIG. 5 is a further detailed view of FIG. 3.

In order to securely communicate to the end user that a private key 24 is stored in a secure token 12 from the token 12 to the certificate authority 16, the token 12 must "vouch" for the key. In the preferred embodiment the token 12 is given a secure secret key 30 as illustrated in FIG. 5. The token 12 uses it's own secure secret key 30 in order to attest that the private key "α" 24 for which certification is being requested has been generated within the secure token 12 and, in turn, that the use of the key 24 is controlled by the validation engine 20 within that token 12. Only the token 12 and the CA 16 may know the secure secret key 30, in one instance, or it may be a public key mechanism. However, in the case of a public key mechanism, the token has a private key which is either programmed in by the CA, or generated within the token such that the public key is recorded or certified prior to the token being delivered to the end user. Regardless, the key which authenticates the token is established, recorded, or certified prior to the certificate being delivered to the end user, such that it is known that the token has not been tampered with, and, in turn, that the token authentication key is authentic.

The secure token 12 attestation is accomplished prior to delivery to the end user in a secure domain. The secure token 12 is asked to generate a key pair comprising the token secure key 30 and a corresponding public key. It stores the private key secure and within the token, using it only in the token attestation process. The corresponding public key is taken and certified by a CA. This CA may be a public CA, one controlled by the token's manufacturer, or some other authority. By issuing the certificate, the CA attests that the private key is controlled by a token 12 that prevalidates the certificate. The attestation certificate is stored within the token 12 as indicated at 32. Presumably, in order to make this attestation, the token 12 will have to be physically within a secure facility in order for the CA to be sure that it is certifying a correctly obtained public key.

Once the token 12 has secure key 30 and an associated certificate 22 stored within, it is delivered to the user. The end user 18 asks the token 12 to generate a key pair for ongoing use, which it does. Then, the end user 18 asks the token 12 to request a certificate 22. The token 12 generates a certificate request and authenticates this request via its token attestation key 30. In this case the token 12 acts as an initial registration agent: it signs the certificate request data with its secure key 30 to attest to its validity and its origination within the token 12, then appends its own certificate 32. The registered request can then be forwarded to the CA. Upon receiving this request, the CA can validate the token's attestation certificate (including possibly independently checking whether the token's certificate is still valid) and its signature on the certificate request data. When the checking procedure succeeds, the CA issues a certificate 22 with the knowledge that the private half of the key pair being certified is securely held within a token 12 which will determine the validity of the certificate before the private key 24 can be used. The CA appends an extension 28 to the certificate 22 indicating to the end user that a relying party need not independently check the revocation status of the certificate.

In addition to validating the current status of a certificate before allowing a private key operation to proceed, the validation engine may also ensure that the use of the private key is conformant with a particular policy. That policy is customizable to a specific end user of group of users such as a corporation. The policy is typically stored in the certificate however, it may be associated in some other manner. For example, a particular key may only be approved for use in signing messages, and not decryption. Complex policies could be created and enforced, potentially making use of external communication. A secure token issued to a corporate certificate authority could enforce a policy which would only allow the private key to be used to sign certificates for employees of that company who appear on some master list, or who are approved by some other server. Such a policy would control the use of the key, the profile of the certificates to be signed, the contents of some fields of those certificates, and validating information from other fields in those certificates against an external data source. Similar policies could be created regarding the disposition of data that is decrypted using the private key.

There is a plurality of mechanisms that the token 12 may use to determine if a certificate is valid. The token 12 often acts as a relying party and utilize an online certificate status mechanism or a certificate revocation list. As an efficiency mechanism, the token need not consult a CA for every use of the private key. Instead, the token caches the validity information and verifies that information on a periodic basis. The period of time elapsed between information verification, may be as high as once a second, for an extremely high value key, but may be more likely on a longer interval. The interval would have some relationship to the risk borne should the key become compromised. This time period is customizable by the end user.

The use of a validation engine within a token facilitates the scalability of the overall system. It replaces many clients, which individually request certificate status with a single centralized point requesting such status. Further, the validation engine may reduce the computational load on a certificate status provider by using symmetric cryptography to verify status responses. In this embodiment, the system employs a protocol like SSL, such that the token 12 negotiates a secure connection with the certificate status provider. A connection consists of a handshake phase that uses public-key cryptography to establish a shared secret key known to both ends of the connection. Thereafter, individual messages passed over the connection are authenticated, and optionally encrypted, using keys derived from this shared secret. Such symmetric operations are more efficient than digital signatures and public-key encryption operations that would be required to individually encrypt and authenticate each message.

A token typically issues repeated requests for certificate status, and these requests place a large computational load on both the token itself and the CA. This load is greatly reduced by negotiating a secure connection, in which the certificate status provider is authenticated as a trusted provider of certificate status information. Thereafter, certificate status queries and responses can be sent over the secure connection, each being symmetrically authenticated with the shared secret key negotiated in the handshake phase of establishing the secure connection. In protocols such as SSL, these symmetrically authenticated messages may be transmitted over several connections, each deriving its keys from a single shared secret established in an initial handshake. This use of a secure connection instead of individually authenticated messages gains a performance advantage by leveraging a single public key operation (in the handshake) into authenticating several or many different certificate status request/response pairs. This is at the cost of those certificate responses no longer being individually authenticated in such a fashion that they could be presented to third parties for verification.

In order to communicate with the certificate authority or its designated agent, the token in some cases requires access to an external network. In the preferred embodiment, a helper application runs on the computer that hosts the token (assuming that the token is an expansion card or some other such device which does not have direct access to network capabilities). Such a helper application acts as a gateway between the token and the service(s) it requires on the network, conveying data back and forth. The endpoint of all secure communications with the certificate status providers must be within the secure shroud of the token; this means that the helper application can serve as a conveyer of data to and from the token, but cannot serve as the endpoint for security protocols (such as SSL).

The verification engine prevents use of a private key unless a certificate status provider can be contacted and a positive assertion about the current validity of the certificate is attained. Therefore, the reliability of the network connections between the token, its hosting computer, and the certificate status provider are of paramount importance to the ongoing reliability and availability of the service being provided by the token's private key. Thus, it is of great value to have multiple, redundant, and independent mechanisms for the token to contact the certificate status provider or providers.

The certificate extension informing the relying party that a private key is protected with a certificate validation engine may further include a mechanism to communicate to the relying party what the parameters this protection includes. For example:

- The physical protection level of the token (for example, FIPS 140-1 level 1, 2, 3, or 4).
- The frequency of validity checks performed by the validation engine (for example, whether the CA is contacted for every transaction, every minute, hour, day, or some other period).
- What other policies are enforced by the validation engine (for example, around the allowed use of the key or the validation of the actual messages signed).

In addition to refusing the use of the signature engine upon determination that the CA has not allowed such usage, the token could choose to take other actions, such as zeroizing (destroying) the private key or rendering the token unusable.

A token incorporating a certificate validation engine protects against several validity problems that periodically occur in a secure environment. Under some circumstances, the security of the key is betrayed. In a secure token, this is generally coupled with the physical security of the token being betrayed or the software using the token becoming insecure. For example, a server containing a physically secured token may be stolen, giving the thief control of the token. In another example, a server containing such a token could be compromised by a hacker in such a way that the server's authorized operators are no longer certain that the token was only being used in an authorized fashion. In either case, revoking the certificate assigned to the token would cause the validation engine in the token to halt all further use of the token's private key. Another such use is the case of an incorrectly issued certificate. For example, a CA issues a certificate and then find that the papers used to identify the certificate requestor were forged. In this case, the CA revokes the certificate that was issued and the token halts all further use of the certified private key.

Similarly, revocation is also used to manage ongoing validity issues. For example, a certificate issued to a party under some terms or conditions which become invalid at some later point, the recipient of the certificate fails to pay their maintenance fees. In such a case, the CA revokes their certificate, halting further use of the key by the token.

The substantial benefit of a token incorporating a verification engine is that it obviates a need for the relying party to check the revocation independently. This is of particular benefit in situations where a set of relying parties have been deployed which do not check revocation, such as in the case of Internet web browsers implementing the SSL protocol. Most such browsers will not check with a certificate authority to determine that a certificate has been revoked. In such a case, should a certificate be revoked for any reason, such revocation will not have any practical effect on clients using prior art devices which do not check that revocation. However, when using a token incorporating a verification engine, the effect of the revocation is assessed at a single point. The use of the private key corresponding to a certified public key is based on the ongoing validity of the certificate. The result being that it eliminates the need for relying parties to verify the current validity and, in turn, increases the security of a system where many such clients checking certificate validity.

In addition, enforcement of additional policies with respect to the use of the key protects the certificate authority against malicious or accidental misuse of the key. For example, a policy could enforce certain aspects of certificate issuance by a subordinate certificate authority. Thus, the superior certificate authority has confidence that the appropriate use of the subordinate certificate authority is enforced technologically at the point of use of the private key, rather than relying on legal agreements or complex validation procedures by the relying party.

A token incorporating a certificate validation engine is able to manage a number of private keys with their corresponding certificates. The token contacts a number of different certificate authorities to determine the validity of these various certificates to control the usage of their associated private keys. Generally it is inappropriate to have multiple certificates certifying the public key of a particular key pair. Such a circumstance would typically require the token to determine that all these certificates continued to be valid in order to use the private key. However, incorporating a validation engine into a token enable the system to verify only the validity of the certificate which is being used in that particular instance.

Although the invention has been described with reference to certain specific embodiments, various modifications thereof will be apparent to those skilled in the art without departing from the spirit and scope of the invention as outlined in the claims appended hereto.

The embodiments of the invention in which an exclusive property or privilege is claimed are defined as follows:

1. A computer system for establishing a certificate for use in the validation of a request sent between a pair of correspondents on a public key infrastructure, the system comprising:
   an application located at one of said correspondents, said application generating a request;
   a secure token in communication with said application, said secure token including a validation engine, a cryptographic engine, a certificate, and a private key; and
   a certificate authority;
   wherein said secure token receives said request from said application, authenticates the validity of said request through said certificate authority, said certificate is signed by said cryptographic engine using said private key, and said signed certificate is sent to a correspondent, where said certificate is known to be valid by said receiving node.

2. The computer system of claim 1, wherein said validation engine is invoked on each request to utilize said private key of said secure token.

3. The computer system of claim 1, wherein said certificate includes a certificate extension as a mechanism to indicate to said receiving node that said certificate is known to be valid.

4. The computer system of claim 1, wherein said secure token further includes a secure key, wherein said secure key is used to attest to the validity of said private key within said secure token and said private key is controlled by said validation engine each within said secure token.

5. The computer system of claim 1, wherein said validation engine enables the system to ensure said private key within said secure token is conformant with a specified policy.

6. The computer system of claim 1, wherein the validity of said certificate controls the use of said private key.

7. A method for establishing a certificate for use in the validation of a request sent between a pair of nodes on a public key infrastructure, the method comprising the steps of:
   a) generating a request by an application located on said node;
   b) sending said request to a secure token;
   c) analyzing of said request by a validation engine located within said secure token;
   d) sending said request to a certificate authority by said validation engine;
   e) generating a certificate by said certificate authority ensuring the validity of said request;
   f) receiving said certificate by said secure token;
   g) executing said request by a cryptographic engine within said secure token using a private key located within said secure token, where said private key is associated with said certificate authority;

wherein the validity of said certificate is known to an intended receiving node.

8. The method of claim 7, wherein said certificate further includes a certificate extension signed by said certificate authority, and where said extension identifies to a receiving node the validity of said certificate.

9. The method of claim 7, wherein said token further includes a secure key such that on a request by an application said secure key attests to the validity of said private key located within said secure token.

* * * * *